US007230508B2

(12) United States Patent
Jarett et al.

(10) Patent No.: US 7,230,508 B2
(45) Date of Patent: Jun. 12, 2007

(54) COMPACT HIGH-POWER BEAM HOPPING SWITCH NETWORK

(75) Inventors: Keith Jarett, Lafayette, CA (US); Andrew H. Kwon, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 1084 days.

(21) Appl. No.: 10/172,214

(22) Filed: Jun. 13, 2002

(65) Prior Publication Data

US 2003/0231592 A1 Dec. 18, 2003

(51) Int. Cl.
*H01P 1/10* (2006.01)
*H04L 12/50* (2006.01)

(52) U.S. Cl. ....................... 333/101; 333/104; 370/386

(58) Field of Classification Search ................ 333/101, 333/103, 104; 342/373; 343/374; 370/386, 370/387, 388, 411

See application file for complete search history.

(56) References Cited

U.S. PATENT DOCUMENTS 5,258,978 A * 11/1993 Cloonan et al. ............ 370/411

* cited by examiner

*Primary Examiner*—Dean Takaoka
(74) *Attorney, Agent, or Firm*—Ingrassia Fisher & Lorenz, P.C.

(57) ABSTRACT

A switch network for switching network inputs to network outputs includes an initial terminal, an intermediate, and a final terminal layer of switches. The initial terminal layer of switches provides fan-out of the network inputs to widely separated locations in the intermediate layer. The intermediate layer of switches includes two sublayers: a first sublayer providing horizontally aligned fan-outs to the final terminal layer of switches and a second sublayer providing vertically aligned fan-outs to the final terminal layer of switches. The final terminal layer of switches includes a left sublayer and a right sublayer. The left sublayer provides fan-in from the vertically aligned fan-outs and the horizontally aligned fan-outs to the network outputs; the right sublayer provides fan-in from the vertically aligned fan-outs and the horizontally aligned fan-outs to the network outputs; and the fan-in provided by the left sublayer is orthogonal to the fan-in provided by the right sublayer.

26 Claims, 3 Drawing Sheets

COMPACT HIGH-POWER BEAM HOPPING SWITCH NETWORK

BACKGROUND OF THE INVENTION

The present invention generally relates to transmitting communication signals in radio frequency energy beams in wireless communication systems and, more particularly, to time sharing of radio frequency energy beams among a number of different communication channels.

Communication systems on modern satellites and other wireless communication platforms often employ a large number of narrow spot energy beams for communicating radio frequency (RF) signals. The narrower the spot beam, the smaller the user's antenna can be for a given bit rate, or data speed, to be effectively communicated. In a typical such communication system, the wireless communication platform has fewer communication paths (each path corresponding to a transponder) than the number of spot beams, and therefore the paths are time-shared. This time-sharing goes by the name of beam hopping, since conceptually a limited number of active beams are hopping around to serve a larger number of cells. A switch network typically performs the hopping function, selecting a communication path (or no communication path) for each cell, with the selections changing rapidly as the beams hop.

High-power RF signals are difficult to switch rapidly. Even a small insertion loss in the switch element can cause the switch element to heat rapidly and fail. With power levels above a few watts, switchable circulators containing ferrite are typically used. An electrical current pulse switches the magnetization of the ferrite and hence the direction of the circulation, directing the RF signal to either the left or right output port of the circulator. The basic switch element is thus equivalent to a single pole, double throw (SPDT) switch in the waveguide.

A small switch network was included in the Advanced Communications Technology Satellite (ACTS) Ka-band satellite, which was recently decommissioned. The ACTS ferrite switch network was relatively small with only two active beams hopping over 30 and 18 cells, respectively. Nevertheless, the packaged network was relatively bulky. In addition to ACTS, similar ferrite switch networks have been flown on non-commercial satellites.

As can be seen, there is a need in wireless communication systems for the outputs from several high-power amplifiers to be time-shared among a larger number of cells. Moreover, there is a need for a switch network the packaging of which is efficient enough to support 100 or more cells within a mass and size that are practical for a satellite or stratospheric platform payload.

SUMMARY OF THE INVENTION

The present invention provides a compact, high-power beam hopping switch network for wireless communication systems in which the outputs from several high-power amplifiers can be time-shared among a larger number of cells. In addition, the packaging of the switch network of the present invention is efficient enough to support 100 or more cells within a mass and size that are practical for a satellite or stratospheric platform payload.

In one aspect of the present invention, a switch network for switching network inputs to network outputs includes an initial terminal layer of switches, an intermediate layer of switches, and a final terminal layer of switches. The initial terminal layer of switches provides a fan-out of each network input to widely separated locations in the intermediate layer of switches. The intermediate layer of switches provides a horizontally aligned fan-out and a vertically aligned fan-out to the final terminal layer of switches, and the final terminal layer of switches provides fan-in from the vertically aligned fan-outs and the horizontally aligned fan-outs to the network outputs.

In another aspect of the present invention, a switch network for switching network inputs to network outputs includes an initial terminal layer of switches, an intermediate layer of switches, and a final terminal layer of switches. The initial terminal layer of switches provides fan-outs of the network inputs to widely separated locations in the intermediate layer of switches. The intermediate layer of switches includes two sublayers: a first sublayer providing horizontally aligned fan-outs to the final terminal layer of switches, and a second sublayer providing vertically aligned fan-outs to the final terminal layer of switches. The final terminal layer of switches provides fan-in from the vertically aligned fan-outs and the horizontally aligned fan-outs to the network outputs.

In still another aspect of the present invention, a switch network for switching network inputs to network outputs includes an initial terminal layer of switches, an intermediate layer of switches, and a final terminal layer of switches. The initial terminal layer of switches provides a fan-out of the network inputs to widely separated locations in the intermediate layer of switches. The intermediate layer of switches includes two sublayers: a first sublayer providing a horizontally aligned fan-out to the final terminal layer of switches and a second sublayer providing a vertically aligned fan-out to the final terminal layer of switches. The final terminal layer of switches includes a left sublayer and a right sublayer. The left sublayer provides fan-in from the vertically aligned fan-outs and the horizontally aligned fan-outs to the network outputs; the right sublayer provides fan-in from the vertically aligned fan-outs and the horizontally aligned fan-outs to the network outputs; and the fan-in provided by the left sublayer is orthogonal to the fan-in provided by the right sublayer.

In yet another aspect of the present invention, a switch network for switching network inputs to network outputs includes an initial terminal layer of switches, an intermediate layer of switches, and a final terminal layer of switches. The initial terminal layer of switches provides fan-out of the network inputs to locations in the intermediate layer of switches separated by at least approximately 30% of the width of the switch network. The intermediate layer of switches comprises two sublayers: a first sublayer providing a horizontally aligned fan-out to the final terminal layer of switches and a second sublayer providing a vertically aligned fan-out to the final terminal layer of switches. The final terminal layer of switches comprises a left sublayer and a right sublayer. The left sublayer provides fan-in from the vertically aligned fan-out and the horizontally aligned fan-out to the network outputs; the right sublayer provides fan-in from the vertically aligned fan-out and the horizontally aligned fan-out to the network outputs, and the fan-in provided by the left sublayer is orthogonal to the fan-in provided by the right sublayer. Also, each network output is connected to a switch in the final terminal layer of switches, whereby each network output is fed by fan-outs from at least two switches in the intermediate layer of switches.

In a further aspect of the present invention, a method for switching network inputs to network outputs includes steps of: switching the network inputs, using an initial terminal layer of switches, to widely separated locations in an intermediate layer of switches; switching the network inputs, using the intermediate layer of switches, in a horizontally aligned fan-out to a final terminal layer of switches and in a vertically aligned fan-out to the final terminal layer of switches; and switching the network inputs, using the final terminal layer of switches, to provide a fan-in from the vertically aligned fan-out and the horizontally aligned fan-out to the network outputs.

These and other features, aspects and advantages of the present invention will become better understood with reference to the following drawings, description and claims.

DETAILED DESCRIPTION OF THE INVENTION

Figure 1:
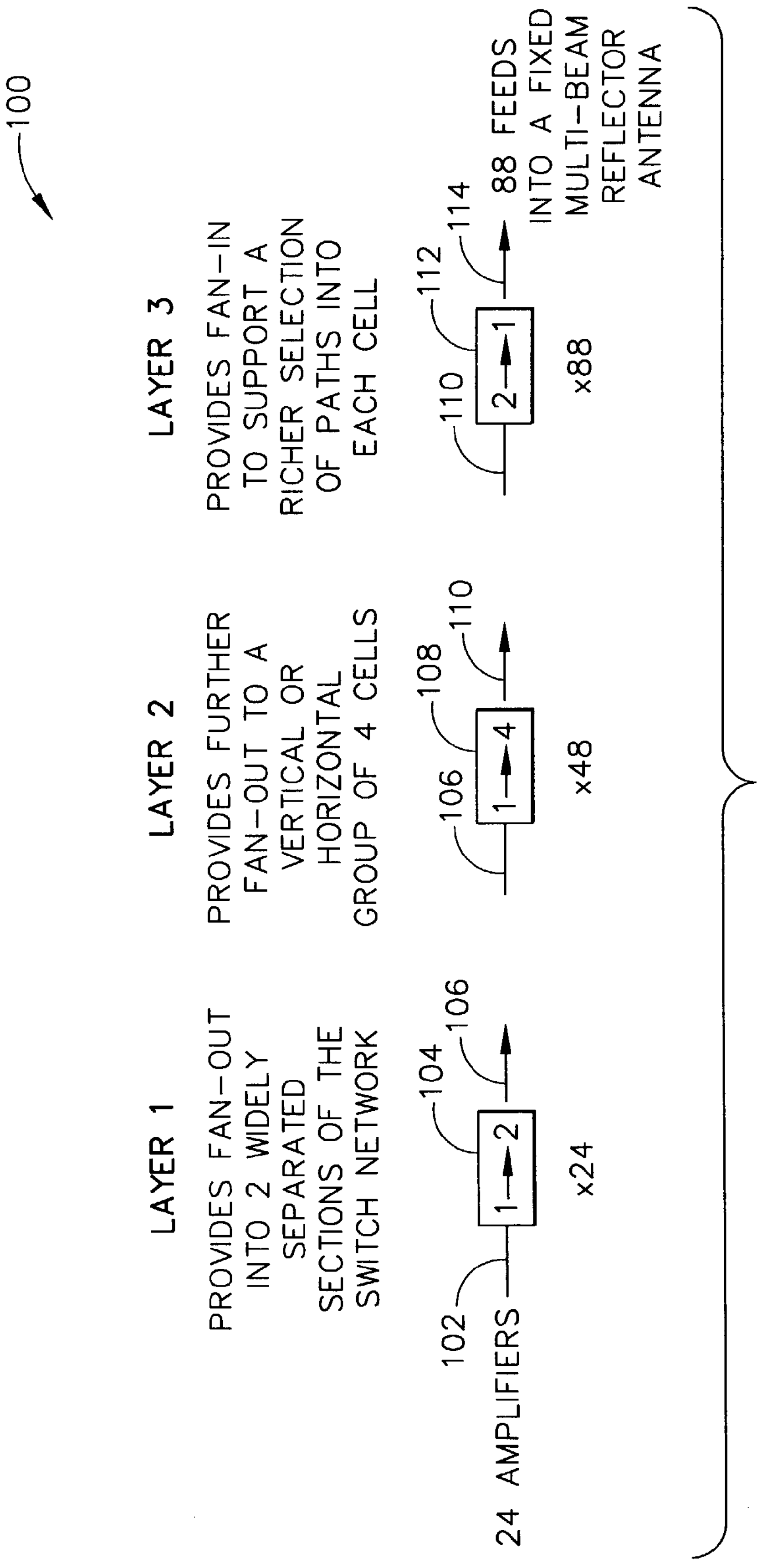
FIG. 1 is a conceptual schematic diagram of the layers of a switch network according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a compact, high-power, beam hopping switch network for wireless communication systems in which the outputs from several high-power amplifiers can be time-shared among a larger number of cells. The compact, high-power, beam hopping switch network of the present invention may be used, for example, in satellite communication systems, where time division multiple access (TDMA) schemes are used to increase the efficiency of the communication system. In addition, the packaging of the switch network of the present invention is efficient enough to support 100 or more cells within a mass and size that are practical for a satellite or stratospheric platform payload. Due to its novel topology, the present invention's switch network has more inputs and outputs, has more flexibility, and is more efficiently packaged than prior art implementations.

Other novelties of the present invention compared to the prior art include simplified interconnection requirements, reduced number of switch junctions, and efficient packaging. The novel interconnection architecture reduces blocking and allows unevenly distributed traffic to be served. That is to say, if a handful of cells in one corner of the antenna coverage (outputs of the switch network) needs high duty factors (large time slices), even the amplifiers on the other corner of the input side of the switch network can serve part of this load.

In one embodiment, the beam hopping switch network connects a number of amplifier outputs (inputs to the switch network) to a larger number of antenna subsystem ports (outputs of the switch network), each of which corresponds to a coverage cell. Thus, for example, where there are "N" amplifiers and "M" ports, and M is a larger number than N, the switch network of the present invention may simultaneously connect the N amplifiers to N of the M ports. Hence, the switch network of the present invention may be said to be purely "spatial" as it makes connections simultaneously while routing signals around each other spatially. For the intended applications of the present invention, each cell can be served equally well by any amplifier. Therefore, the switch network need not provide a possible connection from every amplifier to every cell. For example, an embodiment may use interconnected gateways to add switching capability and relax the requirements on the beam-hopping switch network.

Switching networks can be either blocking or non-blocking. In a blocking network, choices to connect input A to output X and input B to output Y can prevent simultaneously connecting input C to output Z. The exemplary embodiment of the present invention described here is a blocking network. However, the availability of an additional layer of switching, for example, interconnected gateways, mitigates the effects of this blocking. For example, if input C cannot be connected to output Z, one can connect input D to output Z and swap the C and D input signals in the gateway switching layer.

In typical usage, a beam-hopping switch cycles through a series of states once per time division multiple access (TDMA) frame. Each cell gets a time slice of the frame, with the duration of the slice being proportionate to traffic demand in that cell. There is a small guard time between switch states to allow the switch elements to change and settle. During the guard time, there should be no signals present at the inputs to the switch network.

Referring now to FIG. 1, the schematic diagram conceptually shows the layered architecture of switch network 100. In Layer 1, also referred to as an initial terminal layer, each amplifier output, i.e., network input 102, can be fanned out by a switch 104 via Layer 1 outputs 106 to two widely separated sections of the switch network in Layer 2. In Layer 2, also referred to as an intermediate layer, each Layer 1 output 106 can be fanned out by a switch 108 into 4 signal paths 110. In Layer 3, also referred to as a final terminal layer, two signal outputs from Layer 2, i.e., two signal paths 110, can be fanned in by a switch 112 to one antenna port, i.e., network output 114. The overall fan-out of this network, for example, is 1 to 4. The switches may be switchable circulators containing ferrite, as in the exemplary embodiment presented here, or in other embodiments, the switches may include solid state switching components. As seen in FIG. 1, Layer 1 may include 24 switches; Layer 2 may include 48 switches; and Layer 3 may include 88 switches. Other embodiments may include different numbers of switches in each layer, with corresponding changes to the fan-out ratios. Furthermore, other embodiments may include more than one intermediate layer and provide different fan-ins and fan-outs between intermediate layers. In addition, other embodiments may reverse the topology of connections from the example presented here to illustrate one embodiment so that, for example, Layer 3 would be used as the initial terminal layer and Layer 1 would be used as the final terminal layer. The exemplary embodiment presented here may be used, for example, in an implementation using waveguides with switchable circulators containing ferrite, such as in a satellite communications downlink; whereas an embodiment with reversed topology may be used in an implementation including solid state switching components, such as switching microwave signals using field effect transistors (FET) in a satellite communications uplink.

Figure 2:
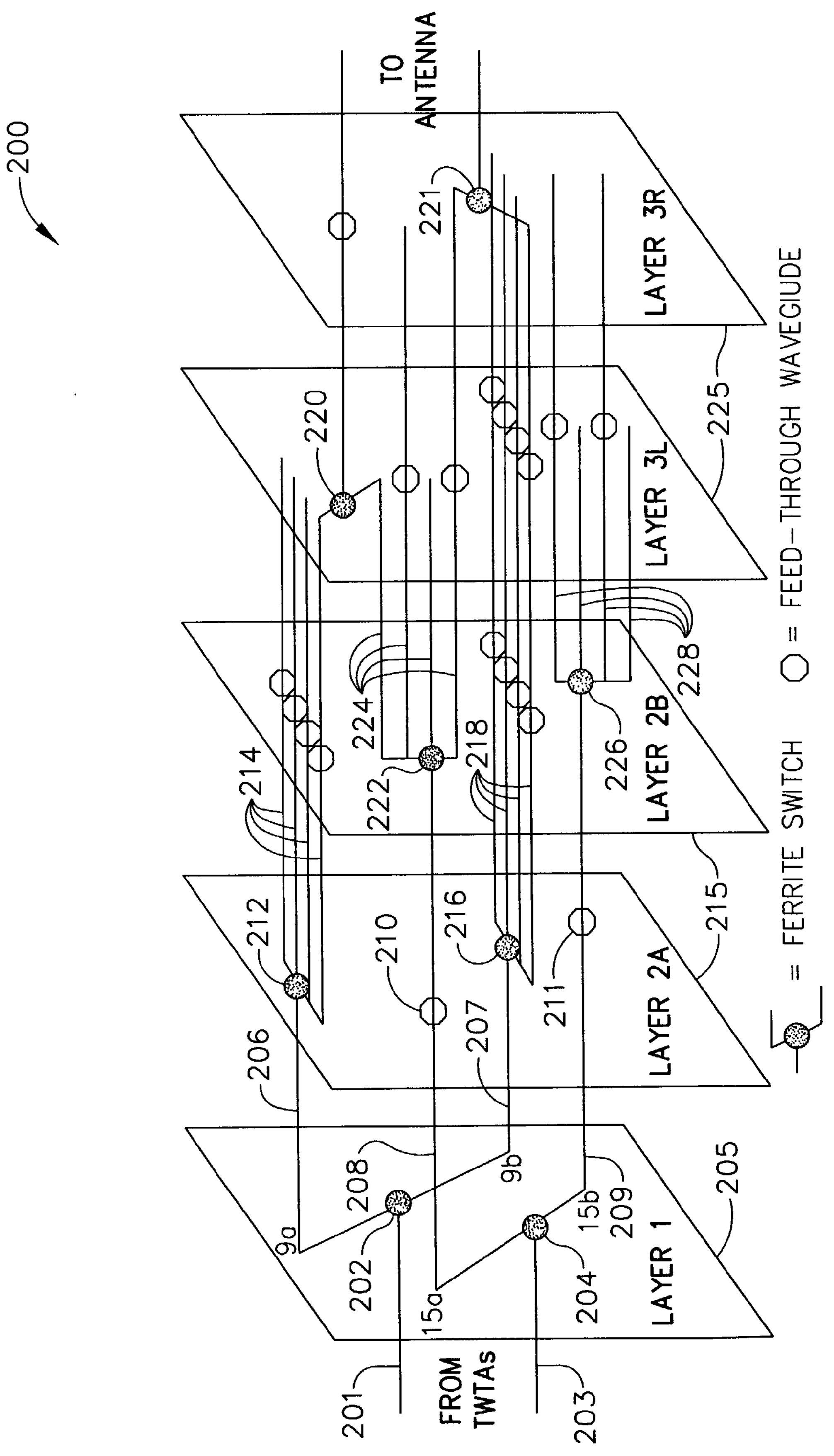
FIG. 2 is a 3-dimensional topological diagram showing exemplary connections between layers of a switch network according to one embodiment of the present invention.

Referring now to FIG. 2, the 3-dimensional topological diagram shows the physical layout of switch network 200. An exemplary portion of switch network 200 is used to illustrate the topology, i.e., the interconnections of switches and paths, of switch network 200. For example, Layer 1 has switches 202, 204 that each diagonally fan out one amplifier output 201, 203 into two locations 206, 207 and, respectively, two locations 208, 209 that are widely separated within the layer. For example, locations may be considered to be widely separated if the fan-out or fan-in spans at least approximately 30% of the width or height of switch network 200. In the example presented here to illustrate one embodiment, Layer 1 has 24 switches, but only two are shown in FIG. 2 for the sake of clarity. Half of the Layer 1 signals, for example, locations 206, 207, are fed to Layer 2A, and the other half, for example, locations 208, 209, pass through Layer 2A, through feed-through waveguides 210, 211 into Layer 2B.

In Layer 2A, each switch, for example, switch 212, may fan out one input location 206 into four outputs, or fan-outs 214, aligned horizontally. The words horizontal and vertical are used to express a relationship of orthogonality in illustrating the example embodiments and need not be taken literally. For waveguide implementations, orthogonality should be understood as the directions of wave propagation within the "vertical" and "horizontal" waveguides being at approximately a 90-degree angle to one another. For switching implementations using solid state components, orthogonality should be understood as being embodied in two mutually independent, i.e., disjoint, sets of signal paths, a "vertical" set of signal paths and a "horizontal" set of signal paths, in which no vertical signal path is horizontal and vice versa. Also in Layer 2A, for example, switch 216 may fan out one input location 207 into four outputs, or fan-outs 218, aligned horizontally. These outputs, fan-outs 214, 218 may pass through Layer 2B on their way to Layer 3. Fan-outs 214 may be fed, for example to switches in Layer 3L. For simplicity, only one of the fan-outs 214 is shown connected to switch 220 in Layer 3L. Fan-outs 218 may be fed, for example to switches in Layer 3R. For simplicity, only one of the fan-outs 218 is shown connected to switch 221 in Layer 3R.

In Layer 2B, each switch, for example, switch 222, may fan out one input location 208 into four fan-outs 224, aligned vertically. Also, for example, switch 226 may fan out one input location 209 into four fan-outs 228, aligned vertically. These fan-outs 224, 228 may pass directly to Layer 3. Half of the fan-outs 224 may be fed, for example, to switches in Layer 3L. For simplicity, only one of the fan-outs 224 is shown connected to switch 220 in Layer 3L. The other half of the fan-outs 224 may be fed, for example, to switches in Layer 3R. For simplicity, only one of the fan-outs 224 is shown connected to switch 221 in Layer 3R. Likewise, half of the fan-outs 228 may be fed, for example, to switches in Layer 3L, and the other half of the fan-outs 228 may be fed, for example, to switches in Layer 3R. For simplicity, none of the fan-outs 228 is shown connected to switches in Layer 3L or 3R.

Thus, half of the Layer 2A signals, i.e. fan-outs, may be fed to Layer 3L, and the other half may pass through Layer 3L into Layer 3R. Similarly, half of the Layer 2B signals may be fed to Layer 3L, and the other half may pass through Layer 3L into Layer 3R. In the example presented here to illustrate one embodiment, the mapping is that Layer 3L processes odd-numbered rows from Layer 2A and even-number rows from Layer 2B; similarly, Layer 3R processes odd-numbered rows from Layer 2B and even-number rows from Layer 2A.

In each switch element of Layer 3L, one signal from Layer 2A and one signal from Layer 2B may be fanned into a single output. The two paired inputs of the fan-in are diagonally adjacent. Layer 3R may work the same way, one signal from Layer 2A and one signal from Layer 2B are fanned-in to a single output, except that the diagonally adjacent pairings in Layer 3R are at a 90 degree angle, i.e., orthogonal, from the pairings in Layer 3L.

In the example presented here, Layer 1 may be referred to as initial terminal layer 205, Layer 2A and Layer 2B may be referred to as intermediate layer 215, and Layer 3A and Layer 3B may be referred to as final terminal layer 225. In a reversed topology embodiment, Layer 3 (3A and 3B) may connect to low-noise amplifiers as the input of switch network 200 and Layer 3 would be referred to as initial terminal layer. Likewise in a reversed topology embodiment, Layer 1 (1A and 1B, below) may connect to repeater subsystem ports as the output of switch network 200 and Layer 1 would be referred to as final terminal layer, whereas Layer 2A and Layer 2B may still be referred to as intermediate layer. Also, as described above, any number of intermediate layers may be provided to alter the fan-in and fan-out of switch network 200. As can be appreciated by persons of ordinary skill in the art, FIG. 2 shows that waveguide runs through switch network 200 can be short, with minimal lateral excursions, providing several advantages including compactness of packaging and signal transmission efficiency.

Figures 3A, 3B:
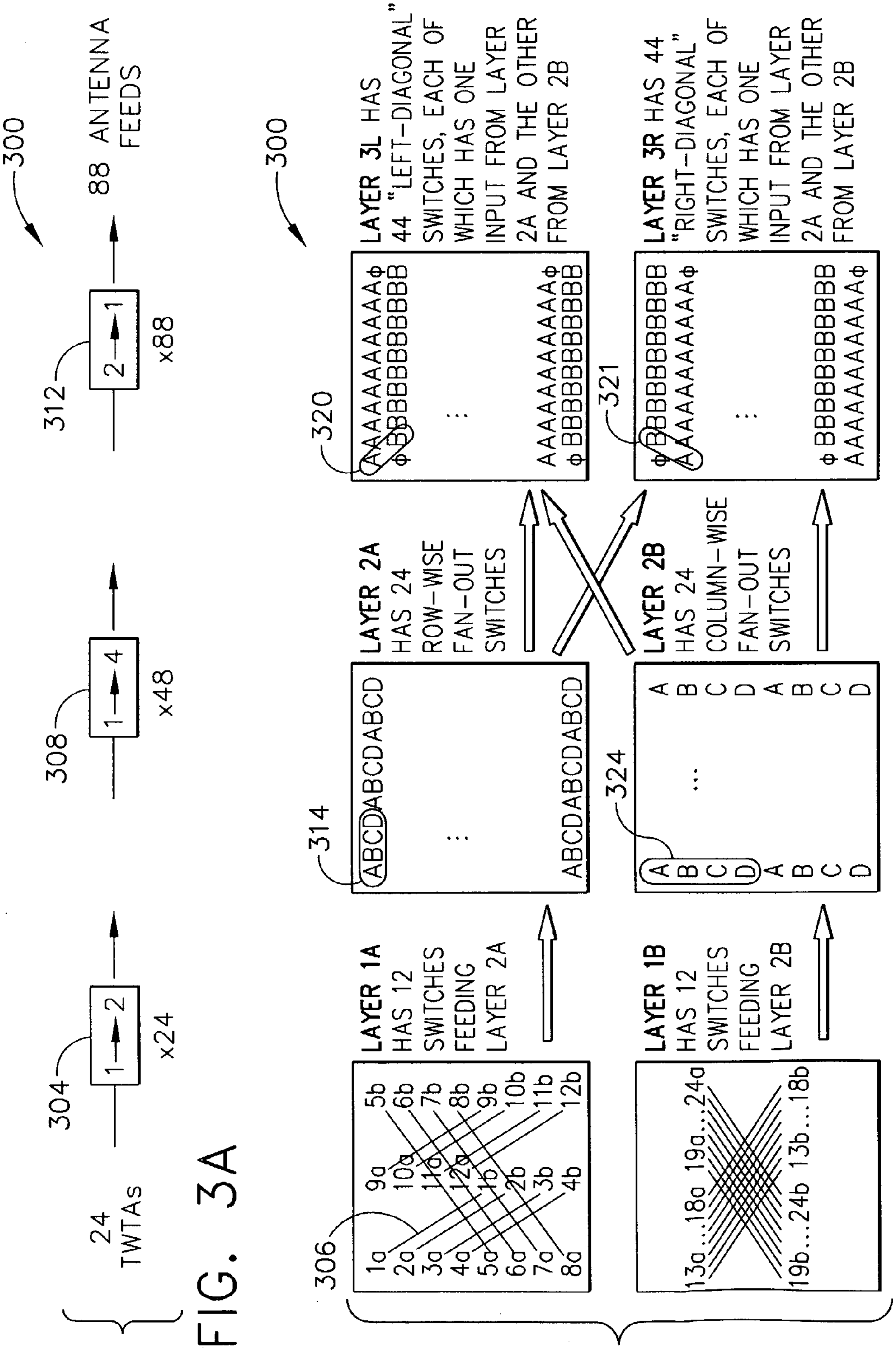
FIG. 3A is a schematic diagram of a switch network according to one embodiment of the present invention, which replicates the information in FIG. 1 for comparison to FIG. 3B.
FIG. 3B is a 2-dimensional schematic diagram showing, in more detail than FIG. 2, exemplary switch layout and connections between layers of a switch network according to one embodiment of the present invention.

FIGS. 3A and 3B show the details of the connections within each layer of switch network 300. For example, each switch 304, shown in FIG. 3A, may correspond to a labeled pair 306 such as "1_a_"/"1_b_" in Layer 1A. Also, for example, horizontal fan-outs 214, seen in FIG. 2, may correspond to Layer 2A outputs 314, and vertical fan-outs 224 may correspond to Layer 2B outputs 324. Each of Layer 2 outputs 314, 324 may correspond to a switch 308 shown in FIG. 3A.

As shown in FIG. 3B, each Layer 2A output may also correspond to a letter "A" in Layers 3L and 3R shown in FIG. 3B, and each Layer 2B output may also correspond to a letter "B" in Layers 3L and 3R shown in FIG. 3B. Each diagonal pair of letters "AB" may correspond to a "left diagonal" switch 320 or a "right diagonal" switch 321. Switch 320, for example, may correspond to switch 220, shown in FIG. 2, and may also correspond to switch 312 shown in FIG. 3A. Switch 321, for example, may correspond to switch 221, shown in FIG. 2, and may also correspond to switch 312 shown in FIG. 3A. Note that sixteen of the Layer 2 outputs, as indicated by the letter "_ø_" in Layer 3L and Layer 3R, are not connected to a fan-in switch element, such as switch 320 or switch 321, in Layer 3. Therefore, in this embodiment, some of the Layer 2 fan-outs only have three usable states rather than four.

In an alternative embodiment, the packaging can be altered so that Layer 1 is merged with Layer 2, giving a stack order of 1A/2A, 1B/2B, 3L/3R, by comparison with the stack order of 1, 2A/2B, 3L/3R seen in FIG. 2. Other alternative stack orders are possible for other embodiments. The switch network architecture of the present invention, with alternate layers of orthogonal connections, can also be used for uplink beam hopping. In that application, ferrite switching would not be needed and low-power semiconductor switches could be used.

One way to implement the layers is to injection mold each layer in plastic, metallize the waveguide sections, and bond the ferrite elements into their proper positions. Another implementation is to machine each layer from aluminum. Heat pipes within or between the layers are essential if high-power signals are being carried. These heat pipes move the heat generated by losses and mismatches in the switch junctions out to the edges of each layer, or beyond, into a heat exchanger or radiator. Each layer may be manufactured separately and the layers fastened together in an assembly to form the switch network.

It should be understood, of course, that the foregoing relates to preferred embodiments of the invention and that modifications may be made without departing from the spirit and scope of the invention as set forth in the following claims.

We claim:

1. A switch network for switching a network input to a network output, comprising an initial terminal layer of switches, an intermediate layer of switches, and a final terminal layer of switches wherein:

said initial terminal layer of switches provides fan-out of said network input to widely separated locations in said intermediate layer of switches, said intermediate layer of switches provides a horizontally aligned fan-out and a vertically aligned fan-out to said final terminal layer of switches, and said final terminal layer of switches provides a fan-in from said vertically aligned fan-out and said horizontally aligned fan-out to said network output, wherein said final terminal layer of switches comprises a left sublayer and a right sublayer, wherein said fan-in from said vertically aligned fan-out and said horizontally aligned fan-out provided by said left sublayer is orthogonal to said fan-in provided by said right sublayer.

2. The switch network of claim 1 wherein a number of network outputs is larger than a number of network inputs.

3. The switch network of claim 1 wherein said intermediate layer of switches comprises two sublayers, a first sublayer providing said horizontally aligned fan-out and a second sublayer providing said vertically aligned fan-out.

4. The switch network of claim 1 wherein each switch comprises a semiconductor switch.

5. The switch network of claim 1 wherein said widely separated locations span at least approximately 30% of the width of the switch network.

6. The switch network of claim 1 wherein said widely separated locations span at least approximately 30% of the height of the switch network.

7. The switch network of claim 1 wherein each network output is connected to a switch in said final terminal layer of switches, whereby each network output is fed by fan-outs from at least two switches in said intermediate layer of switches.

8. The switch network of claim 1 wherein the layers the initial terminal layer, the intermediate terminal layer, and the final terminal layer are fastened together in an assembly to form the switch network.

9. A switch network for switching a network input to a network output, comprising an initial terminal layer of switches, an intermediate layer of switches, and a final terminal layer of switches wherein:

said initial terminal layer of switches provides fan-out of said network input to widely separated locations in said intermediate layer of switches, said intermediate layer of switches provides a horizontally aligned fan-out and a vertically aligned fan-out to said final terminal layer of switches, and said final terminal layer of switches provides a fan-in from said vertically aligned fan-out and said horizontally aligned fan-out to said network output, wherein each switch comprises a switchable circulator using ferrite material.

10. A switch network for switching a network input to a network output, comprising an initial terminal layer of switches, a intermediate layer of switches, and a final terminal layer of switches wherein:

said initial terminal layer of switches provides fan-out of said network input to widely separated locations in said intermediate layer of switches, said intermediate layer of switches comprises two sublayers, a first sublayer providing a horizontally aligned fan-out to said final terminal layer of switches and a second sublayer providing a vertically aligned fan-out to said final terminal layer of switches, and said final terminal layer of switches provides a fan-in from said vertically aligned fan-out and said horizontally aligned fan-out to said network output, wherein said final terminal layer of switches comprises a left sublayer and a right sublayer, wherein said fan-in from said vertically aligned fan-out and said horizontally aligned fan-out provided by said left sublayer is orthogonal to said fan-in provided by said right sublayer.

11. The switch network of claim 10 wherein said widely separated locations span at least approximately 30% of the height of the switch network.

12. The switch network of claim 10 wherein a number of network outputs is larger than a number of network inputs.

13. The switch network of claim 10 wherein each network output is connected to a switch in said final terminal layer of switches, whereby each network output is fed by fan-outs from at least two switches in said intermediate layer of switches.

14. The switch network of claim 10 wherein said widely separated locations span at least approximately 30% of the width of the switch network.

15. A switch network for switching a network input to a network output, comprising an initial terminal layer of switches, an intermediate layer of switches, and a final terminal layer of switches wherein:

said initial terminal layer of switches provides fan-out of said network input to locations in said intermediate layer of switches separated by at least approximately 30% of the width of the switch network, said intermediate layer of switches comprises two sublayers, a first sublayer providing a horizontally aligned fan-out to said final terminal layer of switches and a second sublayer providing a vertically aligned fan-out to said final terminal layer of switches, said final terminal layer of switches comprises a left sublayer and a right sublayer, said left sublayer provides a fan-in from said vertically aligned fan-out and said horizontally aligned fan-out to said network output, said right sublayer provides a fan-in from said vertically aligned fan-out and said horizontally aligned fan-out to said network output, and said fan-in provided by said left sublayer is orthogonal to said fan-in provided by said right sublayer, and each network output is connected to a switch in said final terminal layer of switches, whereby each network output is fed by fan-outs from at least two switches in said intermediate layer of switches.

16. The switch network of claim 15 wherein a number of network outputs is larger than a number of network inputs.

17. A switch network for switching a network input to a network output, comprising an initial terminal layer of switches, an intermediate layer of switches, and a final terminal layer of switches wherein:

said initial terminal layer of switches provides fan-out of said network input to widely separated locations in said intermediate layer of switches, said intermediate layer of switches comprises two sublayers, a first sublayer providing a horizontally aligned fan-out to said final terminal layer of switches and a second sublayer providing a vertically aligned fan-out to said final terminal layer of switches, and said final terminal layer of switches comprises a left sublayer and a right sublayer, said left sublayer provides a fan-in from said vertically aligned fan-out and said horizontally aligned fan-out to said network output, said right sublayer provides a fan-in from said vertically aligned fan-out and said horizontally aligned fan-out to said network output, and said fan-in provided by said left sublayer is orthogonal to said fan-in provided by said right sublayer.

18. The switch network of claim 17 wherein a number of network outputs is larger than a number of network inputs.

19. The switch network of claim 17 wherein said widely separated locations span at least approximately 30% of the width of the switch network.

20. The switch network of claim 17 wherein said widely separated locations span at least approximately 30% of the height of the switch network.

21. The switch network of claim 17 wherein each network output is connected to a switch in said final terminal layer of switches, whereby each network output is fed by fan-outs from at least two switches in said intermediate layer of switches.

22. A method for switching a network input to a network output, comprising steps of:

switching the network input, using an initial terminal layer of switches, to widely separated locations in an intermediate layer of switches;

switching the network input, using said intermediate layer of switches, in a horizontally aligned fan-out to a final terminal layer of switches and in a vertically aligned fan-out to said final terminal layer of switches; and switching the network input, using said final terminal layer of switches, to provide a fan-in from said vertically aligned fan-out and said horizontally aligned fan-out to said network output, wherein said final terminal layer of switches comprises a left sublayer and a right sublayer, and wherein said fan-in provided by said left sublayer is orthogonal to said fan-in provided by said right sublayer.

23. The method of claim 22 wherein said widely separated locations span at least approximately 30% of the width of the switch network.

24. The method of claim 22 wherein said widely separated locations span at least approximately 30% of the height of the switch network.

25. The method of claim 22 wherein a number of network outputs is larger than a number of network inputs.

26. The method of claim 22 wherein said intermediate layer of switches comprises a first sublayer and a second sublayer, and wherein said step of switching in said intermediate layer of switches comprises switching said network input in said first sublayer in said horizontally aligned fan-out and switching said network input in said second sublayer in said vertically aligned fan-out.

* * * * *